(12) United States Patent
Ishii et al.

(10) Patent No.: US 7,179,188 B2
(45) Date of Patent: Feb. 20, 2007

(54) TRANSMISSION APPARATUS FOR A WORKING VEHICLE

(76) Inventors: Norihiro Ishii, 2-18-1, Inadera, Amagasaki-shi, Hyogo (JP); Koji Irikura, 2-18-1, Inadera, Amagasaki-shi, Hyogo (JP)

( * ) Notice: Subject to any disclaimer, the term of this patent is extended or adjusted under 35 U.S.C. 154(b) by 184 days.

(21) Appl. No.: 10/984,865

(22) Filed: Nov. 10, 2004

(65) Prior Publication Data

US 2005/0119084 A1 Jun. 2, 2005

Related U.S. Application Data

(63) Continuation-in-part of application No. 10/627,748, filed on Jul. 28, 2003, now Pat. No. 6,821,225.

(30) Foreign Application Priority Data

Aug. 2, 2002 (JP) ............................. 2002-226045

(51) Int. Cl.
*F16H 47/04* (2006.01)
(52) U.S. Cl. ....................................................... 475/74
(58) Field of Classification Search ................ 180/242, 180/248; 475/74
See application file for complete search history.

(56) References Cited

U.S. PATENT DOCUMENTS 3,122,025 A 2/1964 Mark et al.
3,597,998 A 8/1971 Ebert

FOREIGN PATENT DOCUMENTS

JP 1-72416 5/1989
JP 4-297334 10/1992

*Primary Examiner*—Dirk Wright
(74) *Attorney, Agent, or Firm*—Sterne Kessler Goldstein & Fox P.L.L.C.

(57) ABSTRACT

A transmission apparatus for a working vehicle comprises a hydrostatic transmission, a sun-and-planetary gearing unit, and an auxiliary speed changing system. The hydrostatic transmission includes a hydraulic pump driven by a prime mover equipped on the working vehicle, a hydraulic motor fluidly connected to the hydraulic pump, and a hollow motor shaft serving as an output shaft of the hydraulic motor. The sun-and-planetary gearing unit includes first, second and third elements arranged coaxial to the motor shaft. The first element is drivingly connected to the motor shaft so as to be rotated integrally with the motor shaft. The second element is drivingly connected to front wheels of the working vehicle. The third element is drivingly connected to rear wheels of the working vehicle and differentially connected to the second element through the first element. The auxiliary speed changing system is drivingly interposed between the hollow motor shaft and the first element.

3 Claims, 8 Drawing Sheets

TRANSMISSION APPARATUS FOR A WORKING VEHICLE

BACKGOUND OF THE INVENTION

1. Field of the Invention

The present invention relates to a compact hydrostatic transmission apparatus for a working vehicle with a center differential gearing.

2. Background Art

There is a well-known conventional transmission apparatus for a working vehicle, which distributes power of an engine between a pair of front wheels and a pair of rear wheels, which are differentially connected to each other through a center differential gearing, so as to enable a vehicle having the transmission apparatus to smoothly turn. Japanese Utility Model Application Laid Open Gazette No. Hei 1-72416 discloses conventional arrangement of a center differential gearing in the transmission apparatus having a hydrostatic transmission (hereinafter referred to as an "HST"), wherein the center differential gearing is interposed between an output shaft for driving front wheels and an output shaft (a final pinion shaft) for driving rear wheels, which are arranged coaxially with each other. Between a motor shaft of the HST and the output shaft for driving front wheels extended forward from the center differential gearing is interposed a gearing for speed change having a counter shaft disposed in parallel to them.

Japanese Patent Application Laid Open Gazette No. Hei 4-297334 also discloses a center differential gearing having a cylindrical differential casing, wherein a gearing for speed change is interposed between the differential casing and a shaft that is parallel to the differential casing, and an output shaft for driving front wheels and an output shaft for driving rear wheels disposed coaxially with each other are inserted into the differential casing and differentially connected to each other therein.

Thus, a transmission casing is required to be expanded vertically or laterally for housing the conventional center differential gearing constructed on the assumption that the gearing for speed change is interposed between an input member (usually, a differential casing) of the center differential gearing and a shaft which is disposed in parallel to the input member and on the transmittal upstream side of the input member. In other words, the conventional center differential gearing hinders minimization of a transmission apparatus having an HST.

SUMMARY OF THE INVENTION

An object of the present invention is to provide a compact transmission apparatus for a working vehicle, including an HST which outputs power to a sun-and-planetary gearing differentially connecting rear wheels to front wheels.

To achieve the object, a transmission apparatus for a working vehicle according to the present invention comprises an HST including a hydraulic pump driven by a prime mover equipped on a working vehicle, a hydraulic motor fluidly connected to the hydraulic pump, and a hollow motor shaft serving as an output shaft of the hydraulic motor; and a sun-and-planetary gearing unit including first, second and third elements arranged coaxially to the motor shaft. The first element is drivingly connected to the motor shaft so as to be rotated integrally with the motor shaft, the second element is drivingly connected to front wheels of the working vehicle, and the third element is drivingly connected to rear wheels of the working vehicle and differentially connected with the second element through the first element.

That is, in the sun-and-planetary gearing unit serving as a center differential gearing, the first element, e.g., a differential casing and a carrier, rotated integrally with the motor shaft, the second element, e.g., a front wheel driving shaft, interlocking with the front wheels, and the third element, e.g., a rear wheel driving shaft, interlocking with the rear wheels are arranged coaxially to the motor shaft of the HST so as to receive rotation of the motor shaft without through the counter shaft or so on, thereby saving parts and costs, and realizing a compacting transmission apparatus in which a transmission casing is especially minimized so as to ensure a sufficient ground clearance for a mower disposed below the transmission casing. Moreover, since the motor shaft is disposed co-axially with the sun-and-planetary gearing so that the driving force from the motor may be directly transmitted to the sun-and-planetary gearing unit, the capacity of the HST corresponding to the torque for power transmission to the sun-and-planetary gearing unit is allowed to be set small.

Preferably, in the transmission apparatus, a differential locking mechanism for locking the second and third elements with each other is provided for equalizing circumferential speed between the front wheels and the rear wheels. Since the second and third elements in the sun-and-planetary gearing unit are mutually integrally rotated by the differential locking mechanism, the transmission apparatus enables a vehicle to stably travel on a soft or rough ground while it preventing the front and rear wheels from idling, thereby improving the driving performance of the vehicle.

Further, an auxiliary speed changing system is drivingly interposed between the motor shaft and the first element. Accordingly, the provided transmission can have enhanced speed variation while keeping its compactness.

Preferably, the auxiliary speed changing system includes a transmission shaft disposed in parallel to the second element so as to transmit power from the motor shaft to the first element, thereby being simplified and facilitating its transmission efficiency. Further preferably, the hydraulic pump includes a pump shaft disposed in parallel to the second element and the transmission shaft of the auxiliary speed changing system.

These, other and further objects, features and advantages will appear more fully from the following description.

DETAILED DESCRIPTION OF THE INVENTION

Figure 1:
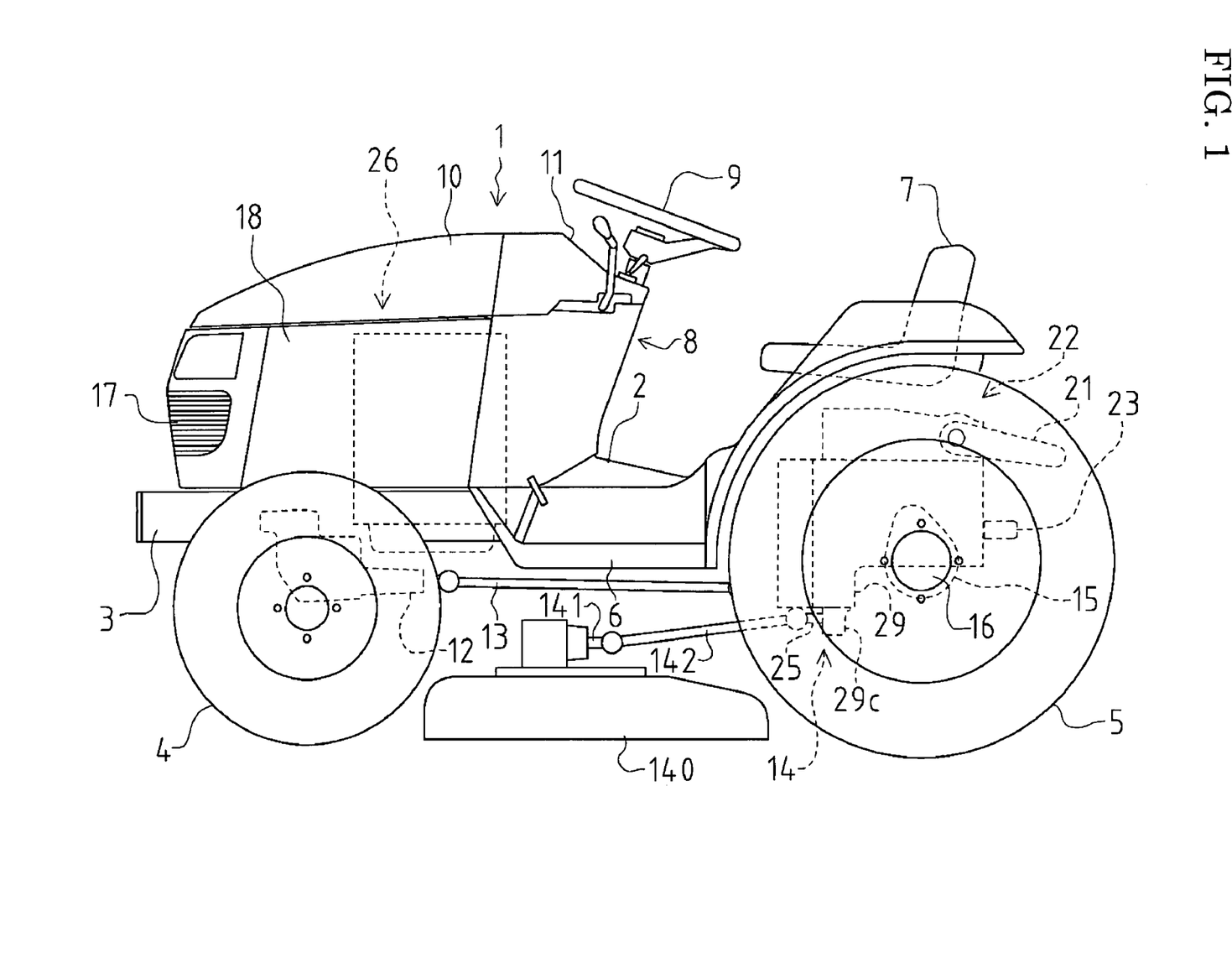
FIG. 1 is a side view of an entire tractor serving as a working vehicle equipped with a transmission apparatus according to the present invention.

Referring to FIG. 1, in a tractor 1, a vehicle frame 3 is disposed lengthwise. A transmission casing 29 of a transmission apparatus 14 is attached at the front surface thereof to the rear end of the vehicle frame 3. Left and right rear axle casings 15 are laterally disposed on the left and right sides of a rear portion of the transmission casing 29. The rear portion of the tractor 1 is applicable for connection with a working machine. A rear PTO shaft 23 for driving the working machine projects rearward from the rear end of the transmission casing 29. A hydraulic lift device 22 including lift arms 21 for raising-and-lowering the working machine is provided on the topside of the end portion of the transmission casing 29.

A mower (mid-mount mower) 140 is suspended below the longitudinally middle portion of the tractor 1. A bottom gearbox 29c attached upwardly onto the bottom surface of the transmission casing 29 and supports a forwardly projecting mid PTO shaft 25 for driving the mower 140. The mower 140 supports an input shaft 141 at the top portion thereof. The input shaft 141 and the mid PTO shaft 25 are connected with each other through a propeller shaft 142 and universal joints.

A front axle casing 12 is supported by the front lower portion of the vehicle frame 3. Front wheels 4 are provided on the respective left and right ends of the front axle casing 12. A pair of left and right rear axles 16 are supported in the respective left and right front axle casings 15, and the rear wheels 5 are attached onto the respective outer ends of rear axles 16. Steps 6 are provided on the respective left and right side ends of the vehicle frame 3. A driver's seat 7 is disposed above the transmission apparatus 14, and a dashboard 8 is vertically mounted on the longitudinally intermediate portion of the vehicle frame 3. An instrument panel 11 is disposed on the top surface of the dashboard 8, and a steering wheel 9 for turning the front wheels 4 is disposed over the instrument panel 11.

An engine 26 is anti-vibratory supported on the vehicle frames 3. Some devices such as a radiator, a battery, an air cleaner and a muffler (not illustrated) are provided around the engine 26 and covered with a front cover 17, side covers 18 and a hood 10.

Figure 2:
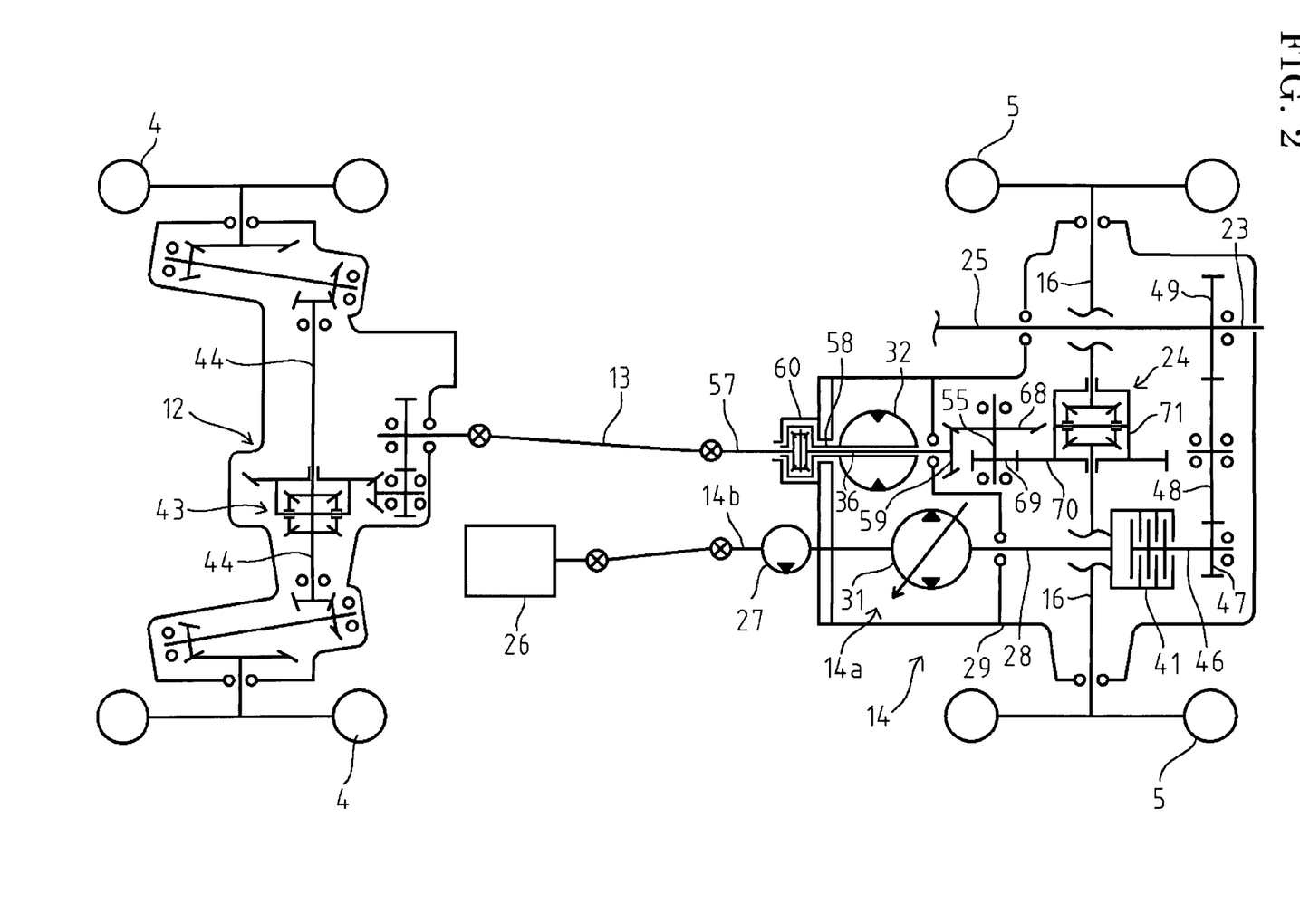
FIG. 2 is a diagram of the transmission apparatus showing entire driving systems for traveling of a vehicle and for PTO.
Figure 3:
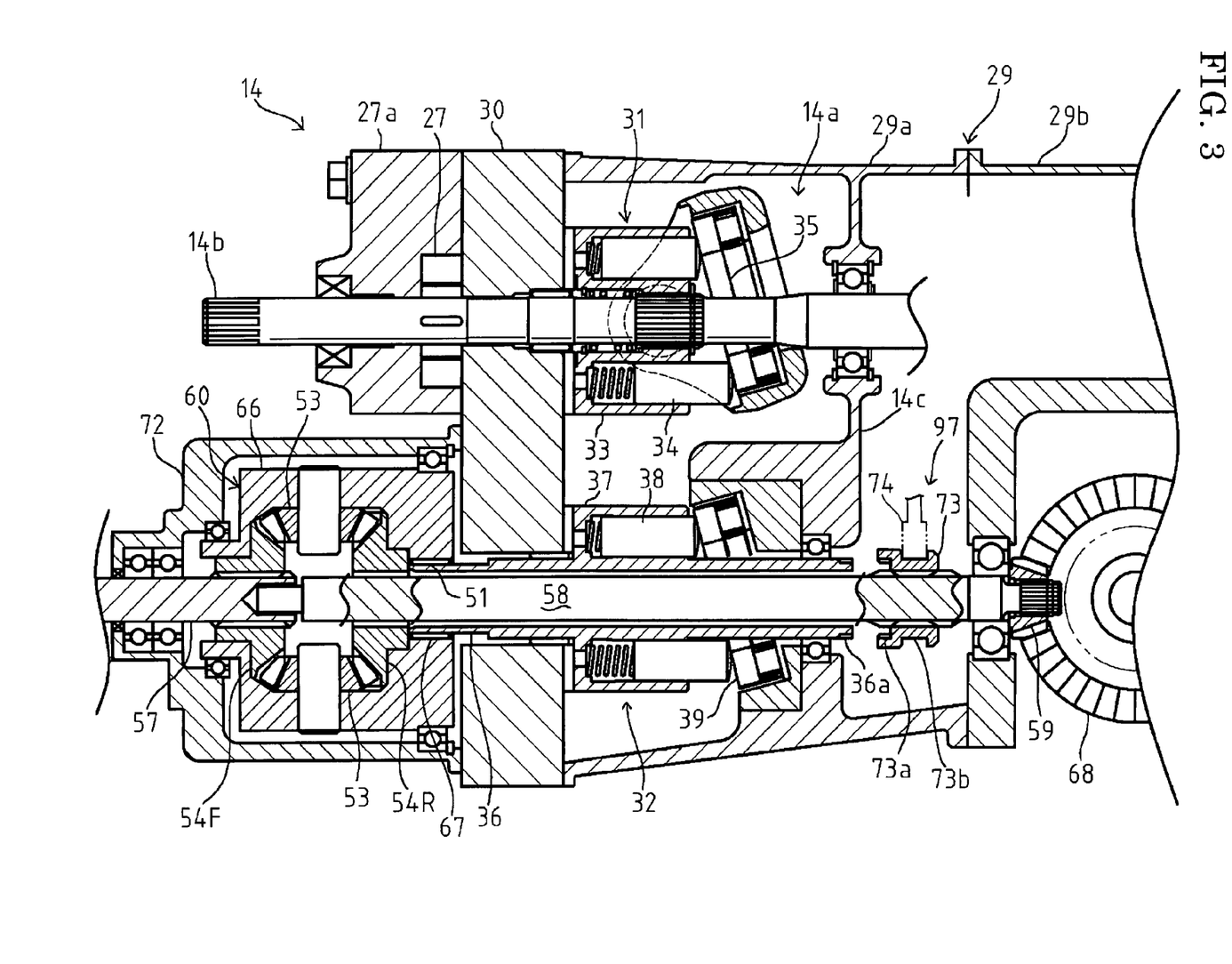
FIG. 3 is a sectional view of a transmission apparatus according to a first embodiment of the present invention.

As shown in FIGS. 2, 3 and others, the transmission apparatus 14 comprises the transmission casing 29, which is separable into a front casing half 29a and a rear casing half 29b. A hydraulic pump 31 and a hydraulic motor 32 fluidly connected with each other constitutes a hydrostatic transmission (hereinafter referred to as "HST") 14a serving as a main transmission part of the transmission apparatus 14, which is provided in a front portion of the transmission casing 29, i.e., in a chamber in front of an upright partition wall 14c formed in the front casing half 29a. An input shaft 14b of the HST 14a, i.e., a pump shaft of the hydraulic pump 31, projects forward from the front end of transmission casing 29.

According to each of embodiments shown in FIGS. 3 to 6, a sun-and-planetary gearing serving as a center differential gearing is disposed in front or rear of the hydraulic motor 32 and has three shafts coaxially projecting therefrom: one is a motor shaft of the hydraulic motor 32, serving as an input shaft of the center differential gearing; another is an output shaft for driving the front wheels 4; and the other is an output shaft for driving the rear wheels 5. Of the three shafts, at least the output shaft for driving the front wheels 4 projects forward in parallel to the input shaft 14b from the front end of the transmission casing 29 so as to be drivingly connected to a front differential gearing 43 (see FIG. 2) in the front axle casing 12 through the propeller shaft 13. Preferably, the hydraulic motor 32 is disposed below the hydraulic pump 31, as shown in FIGS. 3 to 6, so that the output shaft for driving the front wheels 4 projecting the sun-and-planetary gearing is disposed below the input shaft 14b.

A vertical plane center section 30 is attached to the open front surface of the transmission casing 29 i.e., the front casing half 29a so as to fluidly connect the hydraulic pump 31 and the hydraulic motor 32 with each other and to rotatably support the input shaft 14b. The rear surface of center section 30 faces the above-mentioned chamber in front of the partition wall 14c in the front casing half 29a, and forms an upper pump mounting surface and a lower motor mounting surface, onto which the axial piston type hydraulic pump and motor 31 and 32 are mounted so as to constitute the HST 14a. That is, the front portion of transmission casing 29 (the front casing half 29a) between the center section 20 and the partition wall 14c surrounds the HST 14a so as to make a housing for the HST 14a.

A forwardly convex charge pump housing 27a is fixed onto the front surface of the center section 30. The input shaft 14b projects forward through the charge pump housing 27a so as to be drivingly connected to an output shaft of the engine 26. The charge pump housing 27a incorporates a charge pump 27 to be driven by the input shaft 14b. Oil discharged from the charge pump 27 is supplied into the oil passages within the center section 30 as hydraulic oil for the HST 14a, and may be additionally supplied to various portions in the transmission apparatus 14 as lube.

The hydraulic pump 31 of the HST 14a will now be described. As shown in FIG. 3 and others, the input shaft 14b also serving as a pump shaft of the hydraulic pump 31 is disposed lengthwise through the center of the pump mounting surface of the center section 30, and supported by the center section 30 and the partition wall 14c behind the center section 30. A cylinder block 33 is not relatively rotatably disposed axially on the input shaft 14b, and is rotatably slidably fitted onto the pump mounting surface of the center section 30. A plurality of pistons 34 are reciprocally fitted through respective biasing springs into respective cylinder holes bored in the cylinder block 33 around the input shaft 14b and in parallel to the input shaft 14b.

A movable swash plate 35 abuts against heads of the pistons 34. The movable swash plate 35 is tilted so as to change a stroke of the pistons 34, thereby steplessly changing the capacity of the hydraulic pump 31 for discharging hydraulic oil. A circulatory oil passages for hydraulic oil (not illustrated) are bored within the center section 30, thereby supplying the hydraulic motor 32 with hydraulic oil discharged from the hydraulic pump 31.

The hydraulic motor 32 of the HST 14a will now be described. As shown in FIG. 3 and others, a cylinder block 37 of the hydraulic motor 32 is slidably and rotatably fitted to the motor mounting surface of the center section 30. An axially cylindrical motor shaft is integrally made of the member serving as the cylinder block 37, and extended to be directly fitted into the above-mentioned center differential gearing so as to transmit output power from the hydraulic motor 32 to the center differential gearing. One of the two above-mentioned output shafts projecting from the center differential gearing penetrates the motor shaft. A plurality of pistons 38 are reciprocally fitted through respective biasing springs into respective cylinder holes bored in the cylinder block 37 around the motor shaft. A fixed swash plate 39 is fixed to the partition wall 14c and abuts against heads of the pistons 38.

The center differential gearing is directly connected to the motor shaft of the hydraulic motor 32 without through a counter shaft or so on, and differentially distributes the rotational force of the motor shaft between the output shaft for driving the front wheels 4 and the output shaft for driving the rear wheels 5. The output shaft for driving the front wheels 5 is extended rearward into the rear casing half 29b of the transmission casing 29 so as to be drivingly connected to the rear differential gearing 24 therein. In this way, the HST 14a is driven by the input shaft 14b serving as a pump shaft and distributes its output power between the rear differential gearing 24 for the rear wheels 5 and the front differential gearing 43 for the front wheels 4 through the center differential gearing.

The power transmission mechanism from the center differential gearing to the rear wheels 5 and the front wheels 4 through the rear differential gearing 24 and the front differential gearing 43 will now be described in accordance with FIG. 2. The output shaft for driving the rear wheels 5 (in FIG. 2, a rear-wheel driving output shaft 58) extended rearward from the center differential gearing is fixedly provided on the rear end thereof with a bevel pinion (in FIG. 2, a bevel pinion 59). A lateral intermediate shaft 55 is rotatably supported in the rear portion of the transmission casing 29, i.e., in the rear casing half 29b. A bevel gear 68 is fixed on the intermediate shaft 55 and engages with the bevel pinion. The intermediate shaft 55 is also fixedly provided with a small gear 69, which engages with a large gear 70 fixed on a differential casing 71 of the rear differential gearing 24. Therefore, the bevel pinion, the bevel gear 68, the small gear 69 and the large gear 70 constitute a deceleration gear train to the differential casing 71 of the rear differential gearing 24. In the differential casing 71, proximal ends of the rear axles 16 are differentially connected to each other through a differential pinion (or differential pinions) supported by the differential casing 71. In this way, the rotational force of the output shaft for driving the rear wheels 5 projecting from the center differential gearing is transmitted to the rear axles 16 through the rear differential gearing 24 so as to drive the rear wheels 5 provided on the respective outer ends of the rear axles 16.

As mentioned above, the output shaft for driving the front wheels 4 (in FIG. 2, a front-wheel driving output shaft 57) extended forward from the center differential gearing is drivingly, connected to the front differential gearing 43 in the front axle casing 12 through the propeller shaft 13. In the front axle casing 12, left and right differential yoke shafts 44 are laterally oppositely extended from the front differential gearing 43 so as to be drivingly connected to the respective front wheels through respective final deceleration gearings.

The driving system for PTO will be described in accordance with FIG. 2. The input shaft 14b serving as a pump shaft for the HST 14a is extended rearward from the hydraulic pump 31 into a rear portion of the transmission casing 29, i.e., the rear casing half 29b, so as to also serve as a PTO clutch shaft 28, which is applicable to be connected to a PTO input shaft 46 through a PTO clutch 41. A gear 47 is fixed on the PTO input shaft 46 so as to transmit power to the mid PTO shaft 25 and the rear PTO shaft 23 through gears 48 and 49. The operation of the clutch 41 is simultaneously effected on both the PTO shafts 23 and 25. Additionally or alternatively, the PTO shafts 23 and 25 may be clutched independently of each other.

The center differential gearing for distributing output power of the hydraulic motor 32 between the front wheels 4 and the rear wheels 5 is a sun-and-planetary gearing which comprises a first element drivingly connected to the motor shaft of the hydraulic motor 32; a second element drivingly connected to the front wheels 4; and a third element drivingly connected to the rear wheels 5 and differentially connected to the second element through the first element, wherein the first, second and third elements are disposed coaxially to the motor shaft (lengthwise). Hereinafter, description will be given on some center differential gearings according to first to fourth embodiments shown in FIGS. 3 to 6. Incidentally, FIG. 2 illustrates a center differential gearing 60 according to the first embodiment shown in FIG. 3 as an example of the center differential.

Description will be given on the center differential gearing 60 according to the first embodiment of the present invention shown in FIG. 3. The center differential gearing 60 is disposed in a housing 72 fixed onto the lower front surface of the center section 30 in front of the hydraulic motor 32 and below the charge pump housing 27a. In correspondence to the center differential gearing 60 arranged in this way, a cylindrical motor shaft 36 integrally formed by the cylinder block 37 of the hydraulic motor 32 rotatably penetrates the center section 30 and projects forward into the housing 72. In the housing 72, the motor shaft 36 is not relatively rotatably fitted at the front end thereof to a differential casing 66 of the center differential gearing 60 through a spline 51 formed on the motor shaft 36 and a spline 67 formed on the differential casing 66 engaging with each other.

The center differential gearing 60 is composed of a sun-and-planetary gearing including the differential casing 66, which serves as the first element drivingly connected to the motor shaft 36; a front-wheel driving output shaft 57 and a differential side gear 54F fixed thereon, which serve as the second element; and a rear-wheel driving output shaft 58 and a differential side gear 54R, which serve as the third element. The rear end of the output shaft 57 and the front end of the output shaft 58 are inserted into the differential casing 66 and fixedly provided thereon with the respective differential side gears 54F and 54R, which differentially engage with each other through differential pinions 53 supported by the differential casing 66.

The rear-wheel driving output shaft 58 is extended rearward from the differential casing 66 and relatively rotatably and axially penetrates the cylindrical motor shaft 36. The rear-wheel driving output shaft 58 projecting rearward from the motor shaft 36 is fixedly provided on the rear end thereof with a bevel pinion 59 engaging with the bevel gear 68. The front-wheel driving output shaft 57, which is rotatably supported by the differential casing 66 through a bearing, projects forward coaxially oppositely to the motor shaft 36 and the rear-wheel driving output shaft 58.

Behind the partition wall 14c, a differential locking mechanism 97 including a locking slider 73 is provided on the rear-wheel driving output shaft 58 between the bevel pinion 59 and the motor shaft 36. For constituting the differential locking mechanism 97, the motor shaft 36 projects rearward from the cylinder block 37 and is rotatably supported by the partition wall 14c through a bearing so as to project rearward from the partition wall 14c. The rear end of the motor shaft 36 is toothed so as to form a clutch claw 36a.

The locking slider 73 is axially slidably but not relatively rotatably spline-fitted onto the rear-wheel driving output shaft 58. The locking slider 73 is toothed at the front end thereof so as to form a clutch claw 73a facing the clutch claw 36a of the motor shaft 36. The locking slider 73 is peripherally formed with an annular groove 73b. A fork 74 is engaged into the annular groove 73b so as to be operable for axially sliding the locking slider 73 on the rear-wheel driving output shaft 58. By sliding the locking slider 73 forward so as to engage the clutch claw 73a with the clutch claw 36a, the rear-wheel driving output shaft 58 is fixed to the motor shaft 36, thereby establishing a differential locking mode where the output shafts 57 and 58, i.e., the front and rear differential gearings 43 and 24 are locked with each other.

Figure 4:
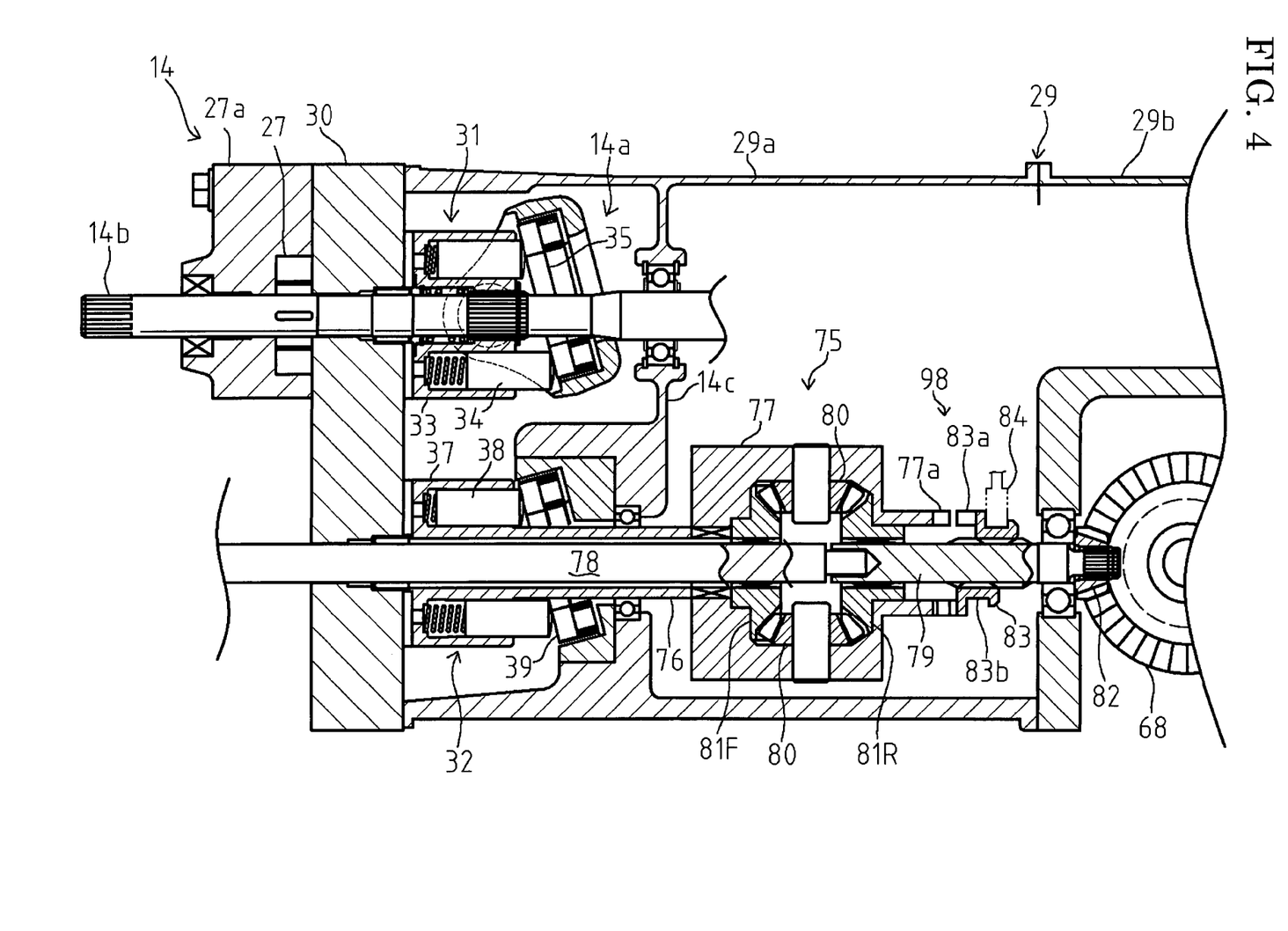
FIG. 4 is a sectional view of a transmission apparatus according to a second embodiment of the present invention.

Next, description will be given on a center differential gearing 75 according to a second embodiment of the present invention shown in FIG. 4. The center differential gearing 75 is composed of a sun-and-planetary gearing, including a differential casing 77, which serves as the first element drivingly connected to a motor shaft of the hydraulic motor 32; a front-wheel driving output shaft 78 and a differential side gear 81F fixed thereon, which serve as the second element drivingly connected to the front wheels 4; and a rear-wheel driving output shaft 79 and a differential side gear 81R fixed thereon, which serve as the third element drivingly connected to the rear wheels 5. The center differential gearing 75 further comprises a pair of bevel pinions 80 for differentially connecting the output shafts 78 and 79 with each other through the differential casing 77.

In the front casing half 79a of the transmission casing 29, the differential casing 77 is disposed behind the hydraulic motor 32 with the partition wall 14c between the hydraulic motor 32 and the differential casing 77. Therefore, a motor shaft 76 of this embodiment is extended rearward from the cylinder block 37 so as to be journalled by the partition wall 14c through a bearing. The motor shaft 76 projects further rearward from the partition wall 14c and is not relatively rotatably fitted at the rear end thereof to the front end of the differential casing 77.

The front-wheel driving output shaft 78 relatively rotatably and axially penetrates the motor shaft 76, and the rear end of the front-wheel driving output shaft 78 is relatively rotatably inserted into the differential casing 77 and fixedly provided thereon with the differential side gear 81F. The front-wheel driving output shaft 78 is extended forward from the motor shaft 76, rotatably penetrates the center section 30, and projects forward from the center section 30 below the charge pump housing 27a so as to be connected to the propeller shaft 13 for driving the front wheels 4.

The rear-wheel driving output shaft 79 is disposed coaxially to the front-wheel driving output shaft 78. In the differential casing 77, the differential side gear 81R is fixed on the front end of the rear-wheel driving output shaft 79 so as to differentially engage with the differential side gear 81F through differential pinions 80 supported by the differential casing 77, thereby differentially connecting the rear-wheel driving output shaft 79 to the front-wheel driving output shaft 78. The rear-wheel driving output shaft 79 is extended rearward from the differential casing 77 and fixedly provided on the rear end thereof with a bevel pinion 82, which engages with the bevel gear 68 for driving the rear wheels 5.

A differential locking mechanism 98 including a locking slider 83 is provided on the rear-wheel driving output shaft 79 between the bevel pinion 82 and the differential casing 77. The rear end of the differential casing 77 is toothed so as to form a clutch claw 77a. The locking slider 83 is axially slidably but not relatively rotatably spline-fitted onto the rear-wheel driving output shaft 79. The locking slider 83 is toothed at the front end thereof so as to form a clutch claw 83a facing the clutch claw 77a of the differential casing 77. The locking slider 83 is peripherally formed with an annular groove 83b. A fork 84 is engaged into the annular groove 83b so as to be operable for axially sliding the locking slider 83 on the rear-wheel driving output shaft 79. By sliding the locking slider 83 forward so as to engage the clutch claw 83a with the clutch claw 77a, the rear-wheel driving output shaft 79 is fixed to the differential casing 77, thereby establishing a differential locking mode where the output shafts 78 and 79, i.e., the front and rear differential gearings 43 and 24 are locked with each other.

Figure 5:
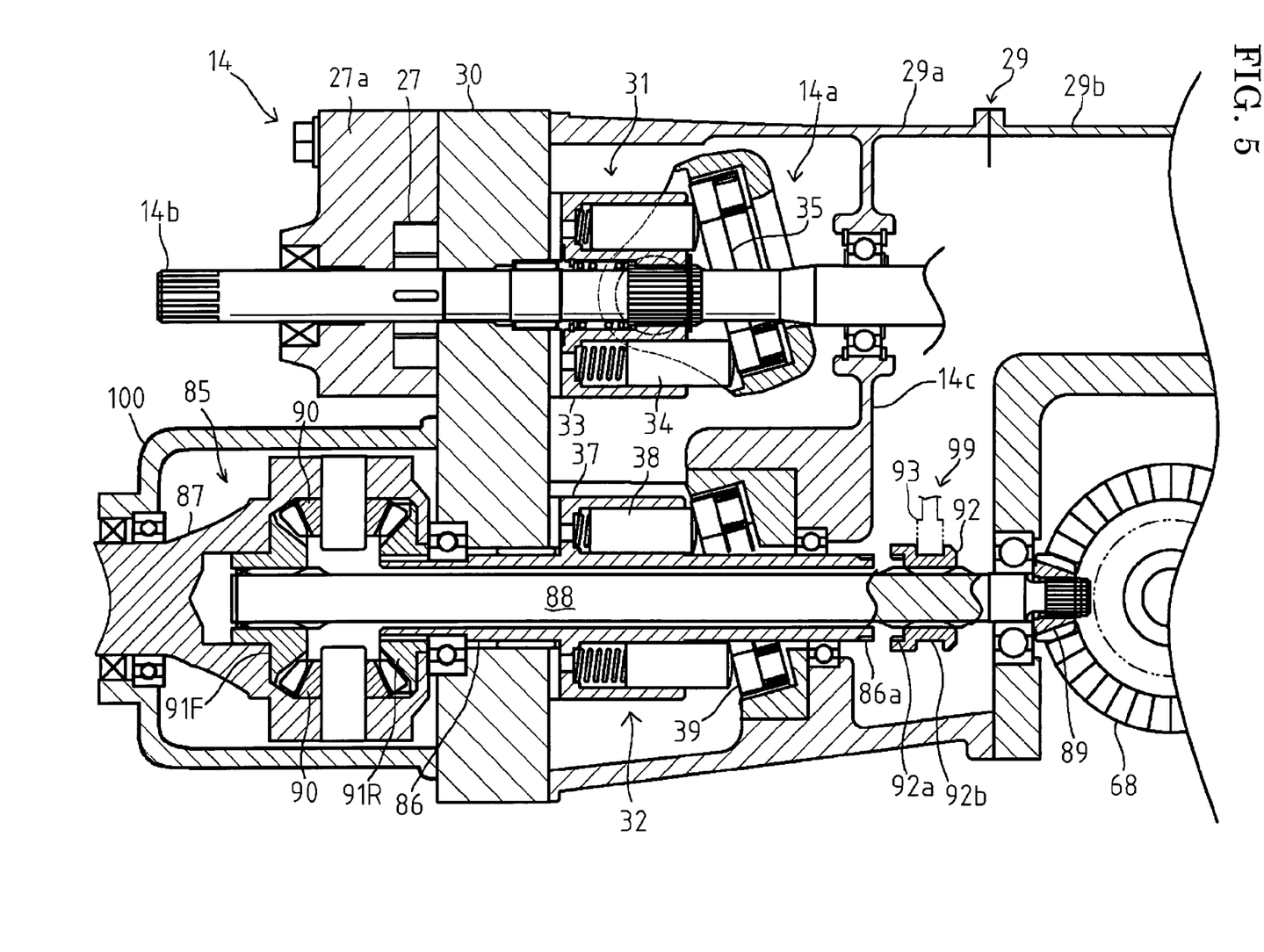
FIG. 5 is a sectional view of a transmission apparatus according to a third embodiment of the present invention.

Next, description will be given on a center differential gearing 85 according to a third embodiment of the present invention shown in FIG. 5. The center differential gearing 85 is disposed in a housing 100, which is attached to the front surface of the center section 30 in front of the hydraulic motor 32 and below the charge pump housing 27a. The center differential gearing 85 is composed of a sun-and-planetary gearing, including a differential side gear 91R, which serves as the first element drivingly connected to a motor shaft of the hydraulic motor 32; a differential casing 87, which serves as the second element drivingly connected to the front wheels 4; and a rear-wheel driving output shaft 88 and a differential side gear 91F fixed thereon, which serve as a third element drivingly connected to the rear wheels 5. The center differential gearing 85 further comprises a pair of differential pinions 90 for differentially connecting the differential casing 87 and the rear-wheel driving output shaft 88 through the differential side gear 91R.

In correspondence to the center differential gearing 85 arranged as mentioned above, a motor shaft 76 of this embodiment is extended forward from the cylinder block 37, rotatably penetrates the center section 30, and is not relatively rotatably fitted at the front end thereof to the rear differential side gear 91R in the differential casing 87.

The differential casing 87 is rotatably supported in the housing 100 and relatively rotatably supports the front and rear differential side gears 91F and 91R. A shaft-like shaped front portion of the differential casing 87 projects forward from the housing 100 so as to be connected to the propeller shaft 13 for driving the front wheels 4.

The rear-wheel driving output shaft 88 relatively rotatably and axially penetrates the motor shaft 86. In the differential casing 87, the rear-wheel driving output shaft 88 is fixedly provided on the front end thereof with the front differential side gear 91F. The front differential side gear 91F differentially engages with the rear differential side gear 91R through the differential pinions 90 supported by the differential casing 87, thereby differentially connecting the rear-wheel driving output shaft 88 to the differential casing 87. The rear-wheel driving output shaft 88 is extended rearward from the motor shaft 86 and fixedly provided on the rear end thereof with a bevel pinion 89, which engages with the bevel gear 68 for driving the rear wheels 5.

Behind the partition wall 14c, a differential locking mechanism 99 including a locking slider 92 is provided on the rear-wheel driving output shaft 88 between the bevel pinion 89 and the motor shaft 86. For constituting the differential locking mechanism 99, the motor shaft 86 projects rearward from the cylinder block 37 and is rotatably supported by the partition wall 14c through a bearing so as to project rearward from the partition wall 14c. The rear end of the motor shaft 86 is toothed so as to form a clutch claw 86a.

The locking slider 92 is axially slidably but not relatively rotatably spline-fitted onto the rear-wheel driving output shaft 88. The locking slider 92 is toothed at the front end thereof so as to form a clutch claw 92a facing the clutch claw 86a of the motor shaft 86. The locking slider 92 is peripherally formed with an annular groove 92b. A fork 93 is engaged into the annular groove 92b so as to be operable for axially sliding the locking slider 92 on the rear-wheel driving output shaft 88. By sliding the locking slider 92 forward so as to engage the clutch claw 92a with the clutch claw 86a, the rear-wheel driving output shaft 88 is fixed to the motor shaft 86, thereby establishing a differential locking mode where the differential casing 87 and the rear-wheel driving output shaft 88, i.e., the front and rear differential gearings 43 and 24 are locked with each other.

Figure 6:
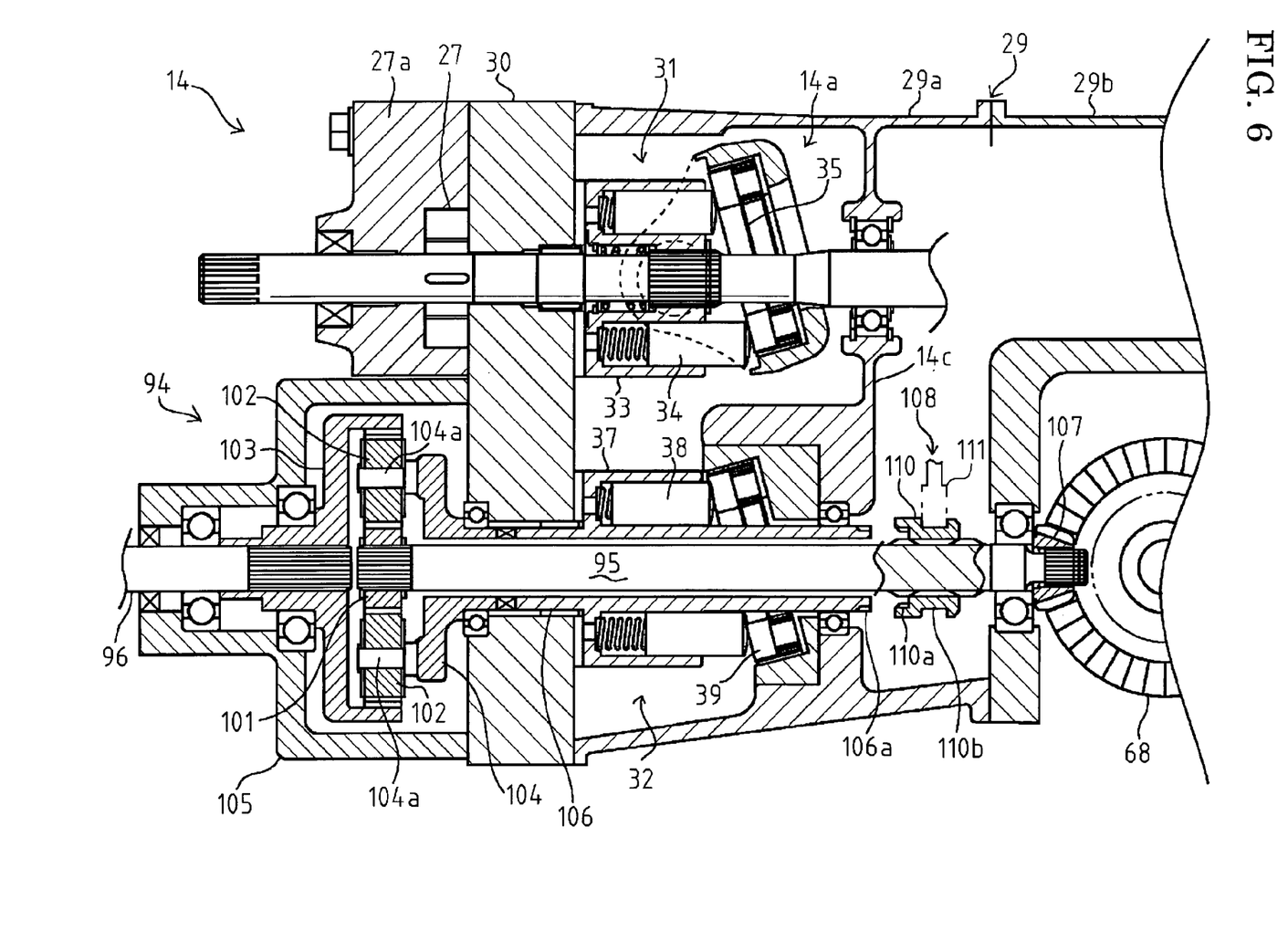
FIG. 6 is a sectional view of a transmission apparatus according to a fourth embodiment of the present invention.

Next, description will be given on a center differential gearing 94 according to a fourth embodiment of the present invention shown in FIG. 6. The center differential gearing 94 is disposed in a housing 105, which is attached to the front surface of the center section 30 in front of the hydraulic motor 32 and below the charge pump housing 27a. The center differential gearing 94 is composed of a sun-and-planetary gearing, including a carrier 104, which serves as the first element drivingly connected to a motor shaft of the hydraulic motor 32; a front-wheel driving output shaft 96 and an internal gear 103 fixed thereon, which serve as the second element drivingly connected to the front wheels 4; and a rear-wheel driving output shaft 95 and a sun gear 101 fixed thereon; which serve as the third element drivingly connected to the rear wheels 5. The center differential gearing 94 further comprises planetary gears 102 for differentially connecting the output shafts 96 and 95 with each other through the carrier 104.

In correspondence to the center differential gearing 94 arranged as mentioned above, a motor shaft 106 of this embodiment is extended forward from the cylinder block 37, and rotatably inserted into the center section 30 so as to be fixed to the carrier 104, which is rotatably supported by the center section 30 and disposed in the housing 105. Support shafts 104a are arranged at regular intervals around the axis of the motor shaft 106 and project forward from the carrier 104 so as to pivotally support the respective planetary gears 102.

The forward-wheel driving output shaft 96 is rotatably supported by the housing 105 and fixedly provided on the rear end thereof with the internal gear 103 in the housing 105. The internal gear 103 surrounds the planetary gears 102 and engages with them. The front-wheel driving output shaft 96 projects forward from the housing 105 so as to be connected to the propeller shaft 13 for driving the front wheels 4.

The rear-wheel driving output shaft 95 relatively rotatably and axially penetrates the motor shaft 106. In the housing 105, the rear-wheel driving output shaft 95 is fixedly provided on the front end thereof with the sun gear 101. The sun gear 101 is disposed among the planetary gears 102 and engages with them. Therefore, the sun gear 101 differentially engages with the internal gear 103 through the planetary gears 102 supported by the carrier 104, thereby differentially connecting the rear-wheel driving output shaft 95 to the front-wheel driving output shaft 96. The rear-wheel driving output shaft 95 is extended rearward from the motor shaft 106 and fixedly provided on the rear end thereof with a bevel pinion 107, which engages with the bevel gear 68 for driving the rear wheels 5.

Behind the partition wall 14c, a differential locking mechanism 108 including a locking slider 110 is provided on the rear-wheel driving output shaft 95 between the bevel pinion 107 and the motor shaft 106. For constituting the differential locking mechanism 108, the motor shaft 106 projects rearward from the cylinder block 37 and is rotatably supported by the partition wall 14c through a bearing so as to project rearward from the partition wall 14c. The rear end of the motor shaft 106 is toothed so as to form a clutch claw 106a.

The locking slider 110 is axially slidably but not relatively rotatably spline-fitted onto the rear-wheel driving output shaft 95. The locking slider 110 is toothed at the front end thereof so as to form a clutch claw 110a facing the clutch claw 106a of the motor shaft 106. The locking slider 110 is peripherally formed with an annular groove 110b. A fork 111 is engaged into the annular groove 110b so as to be operable for axially sliding the locking slider 110 on the rear-wheel driving output shaft 95. By sliding the locking slider 110 forward so as to engage the clutch claw 110a with the clutch claw 106a, the rear-wheel driving output shaft 95 is fixed to the motor shaft 106, thereby establishing a differential locking mode where the output shaft 96 and 95, i.e., the front and rear differential gearings 43 and 24 are locked with each other.

Incidentally, in each of the above-mentioned embodiments, the differential locking mechanism may be alternatively disposed in front of the hydraulic motor 32 or on the axial member for driving the front wheels 4, e.g., the front-wheel driving output shaft 96 in the fourth embodiment.

A transmission apparatus shown in FIGS. 7 and 8 according to a fifth embodiment will be described. The rear surface of center section 30 is joined to the open front end of front casing half 29a of transmission casing 29. A forwardly projecting HST housing 129 is fixed onto the front surface of center section 30. HST housing 129 incorporates HST 14a including vertically parallel hydraulic pump 31 and motor 32, which are mounted onto the front surface of center section 30 and fluidly connected to each other through fluid passages formed in center section 30.

Hydraulic pump 31 and motor 32 include respective cylinder blocks 33 and 37 rotatably slidably fitted onto the front surface of center section 30, and include movable swash plate 35 and fixed swash plate 39, respectively, in front of respective cylinder blocks 33 and 37.

Pump shaft 14b of hydraulic motor 31 extends forward from cylinder block 33, rotatably penetrates movable swash plate 35, and projects forward from the front end of HST housing 129, thereby serving as a common input shaft of the entire transmission apparatus. Pump shaft 14b extends backward from cylinder block 33, rotatably penetrates center section 30. Charge pump housing 27 incorporating charge pump 27 is fixed onto the rear surface of center section 30 opposite to hydraulic pump 31. Pump shaft 14b rotatably penetrates charge pump housing 27 so as to serve as a drive shaft of charge pump 27.

A partition wall 29f is formed of front casing half 29a so as to divide the inner space of front casing half 29a into front and rear chambers. PTO input shaft 46 is disposed coaxially to pump shaft 14b, and journalled by partition wall 29f. The rear end of pump shaft 14b and the front end of PTO input shaft 46 relatively rotatably fit each other between charge pump housing 27a and partition wall 29f. Wet multi-disk type PTO clutch 41 is provided over the fitting junction between shafts 14b and 46 so as to selectively engage or disengage PTO clutch shaft 46 with and from pump shaft 14b.

A PTO brake 42 is disposed within a wall of front casing half 29a toward PTO clutch 41. When PTO clutch 41 engages PTO input shaft 46 with pump shaft 14b, the follower side of PTO clutch 41 is released from PTO brake 42. When PTO clutch 41 disengages PTO input shaft 46 from pump shaft 14b, PTO clutch 41 is barked by PTO brake 42, thereby forcibly braking PTO input shaft 46 regardless of pump shaft 14b. Wet type PTO clutch 41 and PTO brake 42 are supplied with fluid for actuation of their pistons from a fluid passage bored in partition wall 29f behind PTO clutch 41. Especially, PTO input shaft 46 is formed therein with a fluid passage interposed between a fluid chamber of PTO clutch 41 and the fluid passage bored in partition wall 29f.

PTO input shaft 46 extends backward from partition wall 29f. A rear PTO input shaft 146 is disposed coaxially to PTO input shaft 46 so that shafts 46 and 146 are supported mutually. The rear end of rear PTO input shaft 146 is journalled by the rear end of rear casing half 29b. A partition wall 29r is formed of rear casing half 29b so as to divide the inner space of rear casing half 29b into front and rear chambers, and journals the intermediate portion of rear PTO input shaft 146. A rear/mid PTO selection clutch 130 is provided over shafts 46 and 146.

A concrete construction of clutch 130 will be described with reference to FIG. 8. A mid PTO input gear 134 is relatively rotatably fitted on rear PTO input shaft 146. A clutch teeth portion 134a is formed on the front end of mid PTO input gear 134. A clutch teeth member 133 is spline-fitted on the front end of rear PTO input shaft 146 just in front of clutch teeth portion 134a. A spline hub 132 is fixed on PTO input shaft 46 just in front of clutch teeth member 133.

A clutch shifter 131 is constantly spline-fitted on spline hub 132. Clutch slider 131 is axially slidable so as to spline-fit one or both clutch teeth member 133 and portion 134a. When clutch shifter 131 is disposed at its front end slide position so as to fit spline hub 132 and only clutch teeth member 133, rear PTO input shaft 146 (a later-discussed rear PTO shaft 125) is clutched off, and mid PTO input gear 134 (a later-discussed mid PTO shaft 123) is clutched on. In FIGS. 7 and 8, clutch slider 131 disposed at the front end slide position is drawn as a lower portion of clutch slider 131 below shafts 46 and 146. Clutch slider 131 slides backward from the front end slide position so as to fit spline hub 132 and both clutch teeth member 133 and portion 134a, whereby both rear PTO input shaft 146 and mid PTO input gear 134 (rear PTO shaft 125 and mid PTO shaft 123) are clutched on. Clutch slider 131 slides further backward to the rear end slide position so as to fit spline hub 132 and only clutch teeth portion 134a, whereby rear PTO input shaft 146 (rear PTO shaft 125) is clutched on, and mid PTO input gear 134 (mid PTO shaft 123) is clutched off. In FIGS. 7 and 8, clutch slider 131 disposed at the rear end slide position is drawn as an upper portion of clutch slider 131 above shafts 46 and 146.

Figure 7:
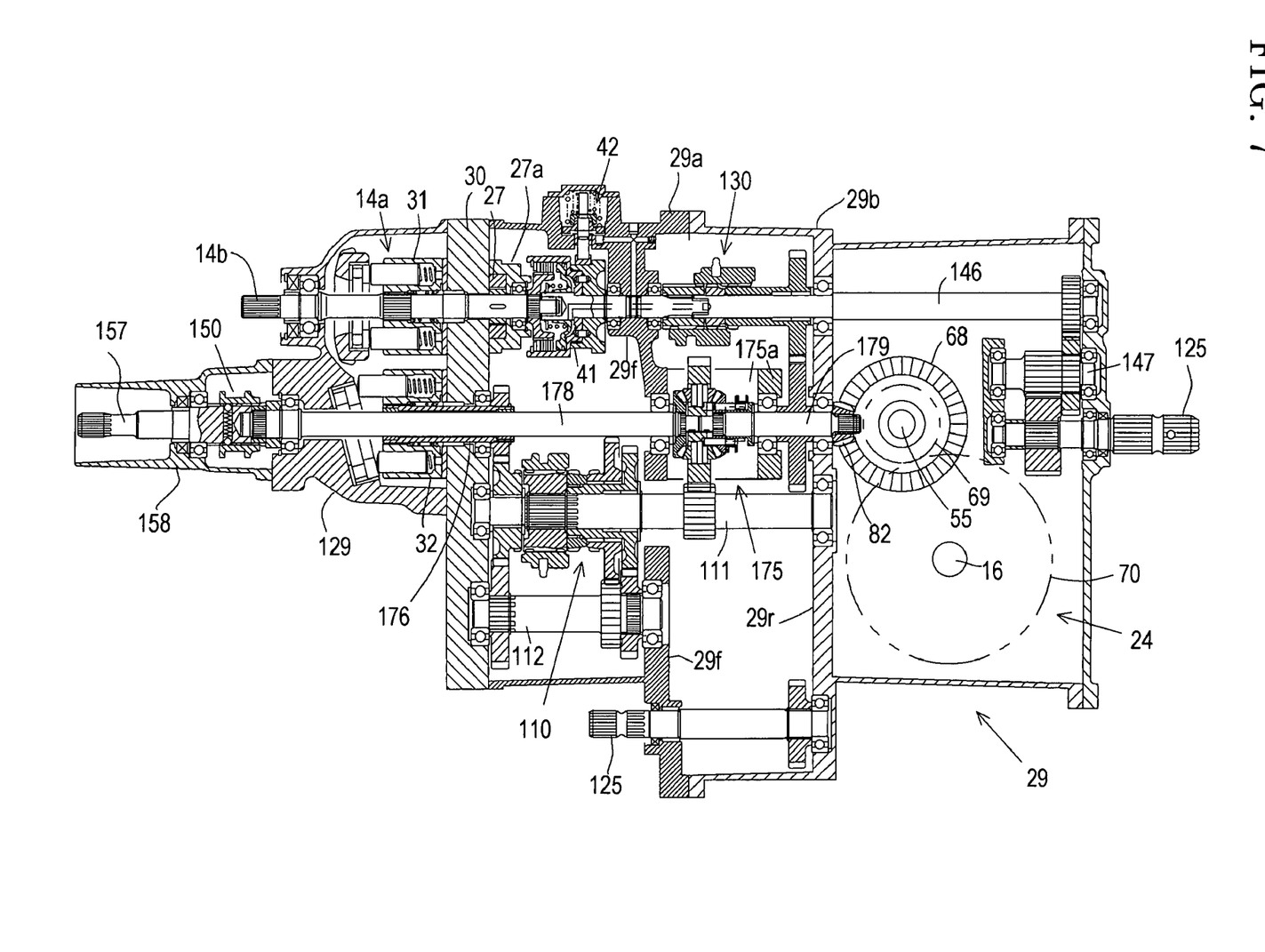
FIG. 7 is a sectional side view of a transmission apparatus according to a fifth embodiment of the present invention.

As shown in FIG. 7, a counter shaft 147 and rear PTO shaft 125 are rotatably disposed in parallel to rear PTO input shaft 146 in a rear portion of rear casing half 29. A deceleration gear train is interposed between shafts 146 and 125 through counter shaft 147. Rear PTO shaft 125 projects rearward from the rear end of transmission casing 29 (rear casing half 29b).

Figure 8:
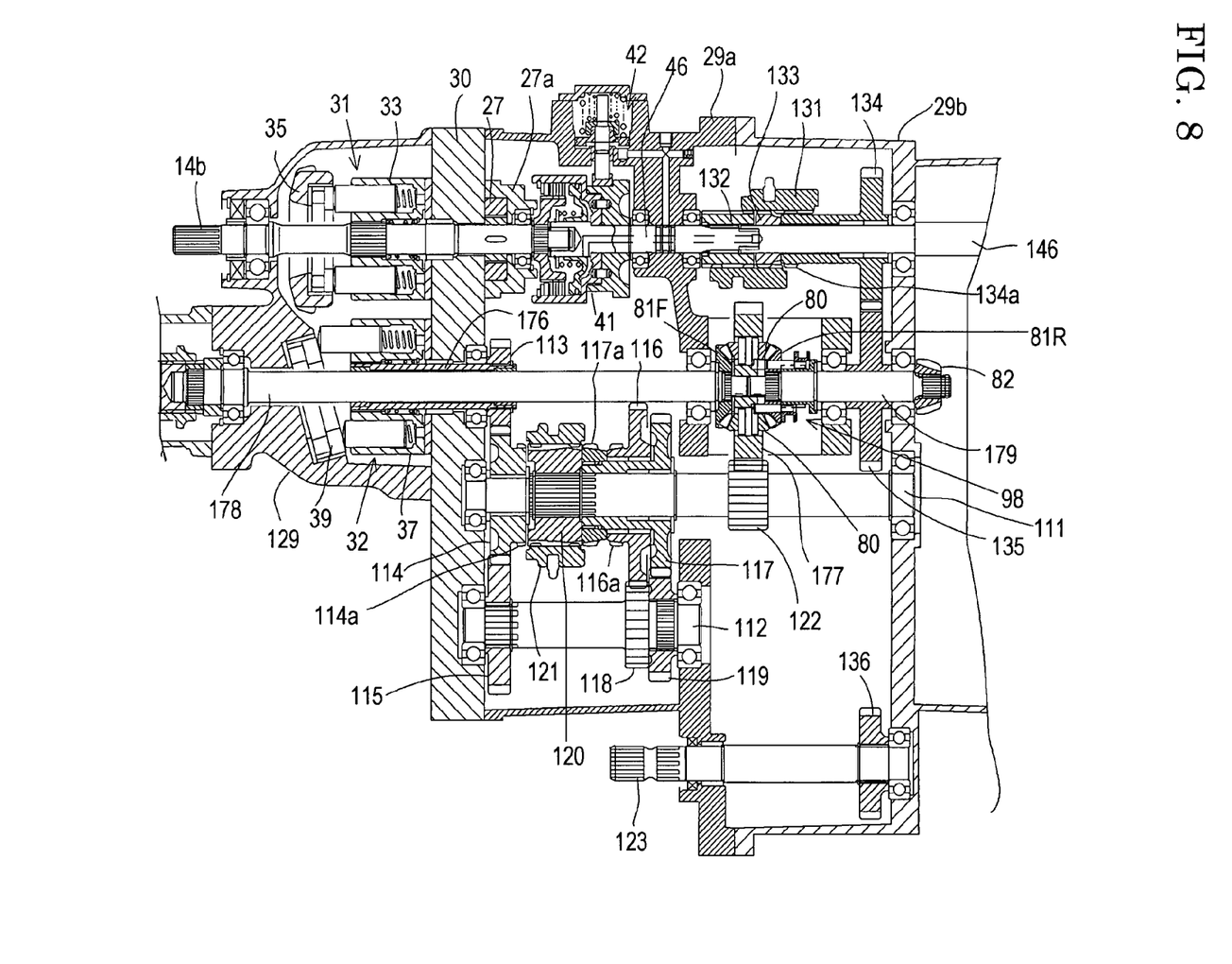
FIG. 8 is an enlarged fragmental sectional side view of the transmission apparatus of FIG. 7.

As shown in FIG. 8, mid PTO input gear 134 meshes with a counter gear 135 relatively rotatably provided on a later-discussed rear wheel driving shaft 179. Counter gear 135 meshes with a gear 136 fixed on the rear end of mid PTO shaft 123 through an unshown idle gear. Mid PTO shaft 123 is journalled at the rear end thereof by an outwardly expanding portion of partition wall 29r of rear casing half 29b, and at the front end thereof by an outwardly expanding portion of partition wall 29f of front casing half 29a. The front end of mid PTO shaft 123 projects further forward from front casing half 29a.

As shown in FIG. 8, an axial motor sleeve 176 serving as a hollow motor shaft of hydraulic motor 32 not-relatively rotatably penetrates cylinder block 37, relatively rotatably supports center section 30, and projects backward from center section 30 so as to have a motor gear 113 fixed on the rear end thereof along the rear surface of center section 30.

A front wheel clutch input shaft 178 coaxially penetrates motor sleeve 176 in parallel to pump shaft 14b, PTO input shaft 46 and rear PTO shaft 146. Motor sleeve 176 is provided on front and rear end inner peripheral surfaces thereof with bushes for relatively rotatably support penetrating shaft 178. A front portion of front wheel clutch input shaft 178 extends forward from cylinder block 37 and rotatably penetrates fixed swash plate 39 and a front end wall of HST housing 129. The front end of front wheel clutch input shaft 178 is inserted into a front wheel clutch housing 158 fixed onto the front end of HST housing 129. The front end of front wheel clutch input shaft 178 is coaxially and relatively rotatably fitted to a rear end of a front wheel driving shaft 157. A front wheel clutch 150 is provided over shafts 178 and 157 so as to engage or disengage front driving shaft 157 with and from front wheel clutch input shaft 178. Front wheel driving shaft 157 is drivingly connected to front wheels 4 through universal joint 13 as shown in FIG. 2.

In front casing half 29a, partition wall 29f journals front wheel clutch input shaft 178. A support casing 175a fixedly projects rearward from a portion of partition wall 29f journaling front wheel clutch input shaft 178. A center differential gear assembly 175 is disposed in support casing 175a so as to differentially connect coaxial shafts 178 and 179 to each other.

The rear end of support casing 175a journals rear wheel driving shaft 179. Counter gear 135 relatively rotatably provided on rear wheel driving shaft 179 between support casing 175a and partition wall 29r. Rear wheel driving shaft 179 projects rearward from partition wall 29r, and bevel pinion 82 is fixed on the rear end of shaft 179. As mentioned above with reference to FIG. 1, bevel pinion 82 meshes with bevel gear 68 on counter shaft 55 so as to transmit power to rear axles 16 with rear wheels 5 through counter shaft 55 and rear wheel driving differential gear assembly 24 drivingly connected to counter shaft 55 through mutually meshing gears 69 and 70.

Center differential gear assembly 175, serving as a sun-and-planetary gearing unit including first, second and third elements arranged coaxial to the motor sleeve (hollow motor shaft 176 will be described with reference to FIG. 8. The rear end of front wheel clutch input shaft 178, serving as the second element, and the front end of rear wheel driving shaft 179. serving as the third element, are relatively rotatably inserted into the center axial hole of bull gear 177, serving as the first element. Bevel differential pinions 80 are pivoted in bull gear 177. The pivotal axes of bevel differential pinions 80 are disposed in the radial direction of bull gear 177. Bevel differential side gear 81F is fixed on shaft 178 just in front of bull gear 177, and bevel differential side gear 81R is fixed on shaft 179 just behind bull gear 177. Each differential pinion 80 meshes with both differential side gears 81 F and 81 R.

Differential locking system 98 is provided on rear wheel driving shaft 179 between support casing 175a and differential side gear 81R. During the operation for differential locking, differential locking system 98 nor-relatively rotatably fits differential side gear 81R to bull gear 177 so that shafts 178 and 179 are locked with each other and cannot differentially rotate.

As shown in FIG. 7, a gear shift type auxiliary speed changing system 110 constitutes a drive train between motor gear 176 and bull gear 177 of center differential gear assembly. Auxiliary speed changing system 110 will be described. An auxiliary speed changing clutch shaft 111 and an auxiliary speed changing counter shaft 112 are disposed in transmission casing 29 in parallel to front wheel clutch input shaft 178. The front ends of shafts 111 and 112 are journalled by center section 30. The rear end of auxiliary speed changing clutch shaft 111 is journalled by partition wall 29r, and the rear end of auxiliary counter shaft 112 by partition wall 29f. Auxiliary speed changing clutch shaft 111 rotatably penetrates partition wall 29f. A pinion gear 122 is fixed on auxiliary speed changing clutch shaft 111 between partition walls 29f and 29r and meshes with bull gear 177 of center differential system 177.

Along the rear surface of center section 30, a high speed gear 114 is relatively rotatably provided on the front end of auxiliary speed changing clutch shaft 111, and a counter gear 115 is fixed on the front end of auxiliary speed changing counter shaft 112. High speed gear 114 meshes with counter gear 115 and motor gear 113 fixed on motor sleeve 176. A first middle speed gear 119 is fixed on auxiliary speed changing counter shaft 112 along the front surface of partition wall 29f. A first low speed gear 118 is fixed on auxiliary speed changing counter shaft 112 just in front of first middle speed gear 119.

A second middle speed gear 117 is relatively rotatably provided on auxiliary speed changing clutch shaft 111 along the front surface of partition wall 29f, and meshes with first middle speed gear 119. Second middle speed gear 117 is formed with a forwardly extending boss portion along shaft 111. A clutch teeth member 117a is fixed on the front end of the boss portion of second middle speed gear 117. A second low speed gear 116 is relatively rotatably provided on the boss portion of second middle speed gear 117 between clutch teeth member 117a and second middle speed gear 117, and meshes with first low speed gear 118. Second low speed gear 116 has a forwardly extending boss portion along the boss portion of second middle speed gear 117. A clutch teeth portion 116a is formed on the front end of the boss portion of second low speed gear 116 just behind clutch teeth member 117a.

High speed gear 114 is formed with a clutch teeth portion 114a on the rear end thereof. A spline hub 120 is fixed on auxiliary speed changing clutch shaft 111 between clutch teeth portion 114a and member 117a. A clutch shifter 121 is constantly spline-fitted on neutral spline hub 120, and axially slidable so as to selectively spline-fit one of clutch teeth portions hubs 114a and 116a and member 117a.

Clutch shifter 121 fits only spline hub 120 so as to put auxiliary speed changing system 110 into a neutral stage, where the rotation of motor sleeve 176 is transmitted to counter shaft 112 through gears 113, 114 and 115, thereby middle speed gears 119 and 117 and low speed gears 118 and 119. In this situation, auxiliary speed changing clutch shaft 111 is stationary because it is relatively rotatable to rotating gears 114, 116 and 119, whereby the rotation of motor sleeve 176 is not transmitted to center differential gear assembly 175.

Clutch shifter 121 is disposed at its front end slide position so as to put auxiliary speed changing system 110 at a high speed stage, where clutch shifter 121 fits spline hub 120 and clutch teeth portion 114a so as to drivingly connect high speed gear 114 to auxiliary speed changing clutch shaft 111. Clutch shifter 121 slides rearward from the above-mentioned neutral position so as to put auxiliary speed changing system 110 into a middle speed stage, where clutch shifter 121 fits spline hub 120 and clutch teeth member 117a so as to drivingly connect middle speed gears 119 and 117 to auxiliary speed changing clutch shaft 111. Clutch shifter 121 slides further rearward so as to put auxiliary speed changing system 110 into a low speed stage, where clutch shifter 121 fits spline hub 120 and clutch teeth portion 116a bypassing clutch teeth member 117a so as to drivingly connect low speed gears 118 and 116 to auxiliary speed changing clutch shaft 111.

Although the invention has been described in its preferred from with a certain degree of particularity, it is understood that the present disclosure of the preferred from has been changed in the details of construction and the combination and arrangement of parts may be resorted to without departing from the spirit and the scope of the invention as hereinafter claims.

What is claimed is:

1. A transmission apparatus for a working vehicle, comprising:
    a hydrostatic transmission including
        a hydraulic pump driven by a prime mover equipped on the working vehicle,
        a hydraulic motor fluidly connected to the hydraulic pump, and
        a hollow motor shaft serving as an output shaft of the hydraulic motor;
    a sun-and-planetary gearing unit including first, second and third elements arranged coaxial to the motor shaft,
    wherein the first element is drivingly connected to the motor shaft so as to be rotated integrally with the motor shaft,
    wherein the second element is drivingly connected to front wheels of the working vehicle, and
    wherein the third element is drivingly connected to rear wheels of the working vehicle and differentially connected to the second element through the first element; and
    an auxiliary speed changing system drivingly interposed between the hollow motor shaft and the first element.

2. The transmission apparatus as set forth in claim 1, wherein the auxiliary speed changing system includes a transmission shaft disposed in parallel to the second element so as to transmit power from the motor shaft to the first element.

3. The transmission apparatus as set forth in claim 2, wherein the hydraulic pump includes a pump shaft disposed in parallel to the second element and the transmission shaft.

* * * * *